US009161307B2

(12) United States Patent
Araragi

(10) Patent No.: US 9,161,307 B2
(45) Date of Patent: Oct. 13, 2015

(54) UPPER-LAYER BASE STATION, LOWER-LAYER BASE STATION AND WIRELESS COMMUNICATION SYSTEM

(75) Inventor: Shinya Araragi, Tokyo-to (JP)

(73) Assignee: KYOCERA Corporation, Kyoto (JP)

( * ) Notice: Subject to any disclaimer, the term of this patent is extended or adjusted under 35 U.S.C. 154(b) by 534 days.

(21) Appl. No.: 13/516,625

(22) PCT Filed: Dec. 17, 2010

(86) PCT No.: PCT/JP2010/072788
§ 371 (c)(1),
(2), (4) Date: Jul. 9, 2012

(87) PCT Pub. No.: WO2011/074673
PCT Pub. Date: Jun. 23, 2011

(65) Prior Publication Data
US 2012/0264477 A1  Oct. 18, 2012

(30) Foreign Application Priority Data

Dec. 18, 2009  (JP) ................................ 2009-287781

(51) Int. Cl.
*H04B 7/00* (2006.01)
*H04W 52/02* (2009.01)
*H04W 16/32* (2009.01)

(52) U.S. Cl.
CPC .......... *H04W 52/0235* (2013.01); *H04W 16/32* (2013.01); *Y02B 60/50* (2013.01)

(58) Field of Classification Search
CPC . H04W 36/165; H04W 72/082; H04W 92/10; H04W 84/045
USPC .............. 455/522, 69, 517, 68, 509, 435.1, 9, 455/13.4, 574, 127.1, 127.5, 422.1, 458, 455/456.1, 444; 370/311, 312, 328, 329, 370/331
See application file for complete search history.

(56) References Cited

U.S. PATENT DOCUMENTS

| 2009/0285143 A1* | 11/2009 | Kwun et al. .................. 370/311 |
| 2010/0144338 A1* | 6/2010 | Kim et al. .................. 455/422.1 |
| 2012/0009936 A1 | 1/2012 | Ishii et al. |

FOREIGN PATENT DOCUMENTS

| JP | 2002-204470 A | 7/2002 |
| JP | 2003-174456 A | 6/2003 |

(Continued)

OTHER PUBLICATIONS

An Office Action; "Notice of Reasons for Rejection", issued by the Japanese Patent Office on Jul. 9, 2013, which corresponds to Japanese Patent Application No. 2009-287781 and is related to U.S. Appl. No. 13/516,625; with statement of relevance of non-English reference.

(Continued)

*Primary Examiner* — Shaima Q Aminzay
(74) *Attorney, Agent, or Firm* — Studebaker & Brackett PC

(57) ABSTRACT

An upper-layer base station forms an upper-layer cell in a wireless communication system in which lower-layer cells are superimposed onto the upper-layer cell. This upper-layer base station includes: an upper-layer wireless section that achieves communication with a wireless terminal that is present within the upper-layer cell; an upper-layer inter-station communication section that achieves communication with lower-layer base stations that form the lower-layer cells; and an upper-layer control section that, via the upper-layer inter-station communication section, commands any one of the lower-layer base stations that satisfies preconditions for making a connection in order to communicate with a wireless terminal that is currently performing communication to switch from a power saving mode to a normal operation mode.

15 Claims, 10 Drawing Sheets

(56) References Cited

FOREIGN PATENT DOCUMENTS

| | | |
|---|---|---|
| JP | 2009-049485 A | 3/2009 |
| JP | 2009-159355 A | 7/2009 |
| WO | 2009/022534 A1 | 2/2009 |

OTHER PUBLICATIONS

International Search Report; PCT/JP2010/072788; Jan. 25, 2011.

* cited by examiner

CELLS WHEN IN POWER SAVING MODE
CELLS WHEN IN NORMAL OPERATION MODE

UPPER-LAYER BASE STATION, LOWER-LAYER BASE STATION AND WIRELESS COMMUNICATION SYSTEM

TECHNICAL FIELD

The present invention relates to an upper-layer base station, a lower-layer base station, and a wireless communication system.

Priority is claimed on Japanese Patent Application No. 2009-287781, filed Dec. 18, 2009, the contents of which are incorporated herein by reference.

BACKGROUND ART

Base stations that are used in wireless communication systems construct communication areas using cells, which are generally known as macrocells, that have a cell radius of between approximately several kilometers and several tens of kilometers. In these macrocell communication areas, there are cases in which areas having poor communication sensitivity are formed because of shielding objects or because of the geographical situation of the base station or the like. In recent years, heterogeneous networks have become utilized as cell structures that are able to ensure high-speed communication in all communication areas of a macrocell. In heterogeneous networks, base stations for small cells, which are known as microcells, are located in low-sensitivity areas of macrocells. The radius of the communication area of a cell is between approximately several hundred meters and one kilometer.

A method in which a plurality of femtocells (i.e., small cells having a cell radius of approximately several tens of meters) are placed adjacently to each other and are consecutively linked together inside commercial facilities such as shops and restaurants is described, for example, in Patent document 1 (see below) as a technology that employs base stations for small cells. In this technology, handovers of mobile stations between adjacent femtocells is permitted. In this case, wireless transmissions from the base stations of femtocells in which no mobile stations are present are stopped. Consequently, when a mobile station moves into such a femtocell, wireless transmissions from the base station of the femtocell that is adjacent to that femtocell is started.

DOCUMENTS OF THE PRIOR ART

Patent Documents

[Patent document 1] Japanese Unexamined Patent Application, First Publication, No. 2009-159355

DISCLOSURE OF THE INVENTION

Problems to be Solved by the Invention

The technology of the above-described Patent document 1 is effective when a plurality of cells are placed adjacently to each other and are consecutively linked together. However, in a heterogeneous network, if a plurality of small cells (microcells, picocells, or femtocells) are present within a macrocell, then because the macrocell and the small cells are not in an adjacent positional relationship, it is not possible to apply the technology of Patent document 1. Moreover, if the number of adjacent femtocells within the macrocell increases, because wireless transmissions are started from the base stations of adjacent femtocells that are not actually connected together (i.e., femtocells for which it is uncertain whether or not a handover should be performed), power is consumed unnecessarily.

The present invention was conceived in view of the above described circumstances. According to the present invention, it is possible to provide an upper-layer base station, a lower-layer base station, and a wireless communication system that are able to minimize the power consumption of a wireless communication system in which lower-layer cells are superimposed on an upper-layer cell.

Means for Solving the Problem

An upper-layer base station according to the present invention is an upper-layer base station that forms an upper-layer cell in a wireless communication system in which lower-layer cells are superimposed onto the upper-layer cell, and that includes: an upper-layer wireless section that achieves communication with a wireless terminal that is present within the upper-layer cell; an upper-layer inter-station communication section that achieves communication with lower-layer base stations that form the lower-layer cells; and an upper-layer control section that, via the upper-layer inter-station communication section, commands any one of the lower-layer base stations that satisfies preconditions for making a connection in order to communicate with a wireless terminal that is currently performing communication to switch from a power saving mode to a normal operation mode.

In the upper-layer base station according to the present invention, based on terminal attribute information that can be acquired by communicating with the wireless terminal, the upper-layer control section determines whether or not a lower-layer base station that satisfies the communication connection preconditions is present.

Moreover, in the upper-layer base station according to the present invention, if, based on position information relating to the wireless terminal which was acquired as the terminal attribute information, the wireless terminal that is currently performing communication is judged to be positioned within the lower-layer cell of one of the lower-layer base stations, the upper-layer control section determines that the lower-layer base station is a lower-layer base station that satisfies the communication connection preconditions.

Moreover, in the upper-layer base station according to the present invention, if, based on the type of communication and on the position information relating to the wireless terminal that were acquired as the terminal attribute information, the type of communication is judged to be data communication, and the relevant wireless terminal is judged to be positioned within the lower-layer cell of one of the lower-layer base stations, the upper-layer control section determines that the lower-layer base station is a lower-layer base station that satisfies the communication connection preconditions.

Moreover, if the type of communication is audio communication, then irrespective of the position information, the upper-layer control section determines that no lower-layer base station that satisfies the communication connection preconditions is present.

Moreover, in the upper-layer base station according to the present invention, if, based on the operating frequency and on the position information relating to the wireless terminal that were acquired as the terminal attribute information, one of the lower-layer base stations is judged to be capable of dealing with the operating frequency of the wireless terminal, and the relevant wireless terminal is judged to be positioned within the lower-layer cell of that lower-layer base station, then the upper-layer control section determines that the lower-layer base station is a lower-layer base station that satisfies the communication connection preconditions.

Moreover, if no lower-layer base station that is capable of dealing with the operating frequency of the wireless terminal is present, then irrespective of the position information, the upper-layer control section determines that no lower-layer base station that satisfies the communication connection preconditions is present.

Moreover, in the upper-layer base station according to the present invention, if the communication load of the upper-layer base station exceeds a specified value, the upper-layer control section determines whether or not a lower-layer base station that satisfies the communication connection preconditions is present.

Furthermore, a lower-layer base station according to the present invention is a lower-layer base station that forms a single lower-layer cell from among a plurality of lower-layer cells in a wireless communication system in which lower-layer cells are superimposed onto an upper-layer cell, and that includes: a lower-layer wireless section that achieves communication with a wireless terminal that is present within the lower-layer cell; a lower-layer inter-station communication section that achieves communication with the upper-layer base station that forms the upper-layer cell; and a lower-layer control section that, when it receives a command to switch from the power saving mode to the normal operation mode from the upper-layer base station via the lower-layer inter-station communication section, it switches the operating mode of its own host base station from the power saving mode to the normal operation mode, and when all of the wireless communication being performed by its own host base station has ended, it switches the operating mode of its own host base station to the power staving mode.

Furthermore, a wireless communication system according to the present invention is a wireless communication system that employs a structure in which lower-layer cells are superimposed onto an upper-layer cell, and that is provided with an upper-layer base station that forms the upper-layer cell and a plurality of lower-layer base stations that respectively form the plurality of lower-layer cells, wherein the upper-layer base station includes: an upper-layer wireless section that achieves communication with a wireless terminal that is present within the upper-layer cell; an upper-layer inter-station communication section that achieves communication with the lower-layer base stations that form the lower-layer cells; and an upper-layer control section that, via the upper-layer inter-station communication section, commands any one of the lower-layer base stations that satisfies preconditions for making a connection in order to communicate with a wireless terminal that is currently performing communication to switch from a power saving mode to a normal operation mode, and wherein each one of the lower-layer base stations includes: a lower-layer wireless section that achieves communication with a wireless terminal that is present within the lower-layer cell; a lower-layer inter-station communication section that achieves communication with the upper-layer base station that forms the upper-layer cell; and a lower-layer control section that, when it receives a command to switch from the power saving mode to the normal operation mode from the upper-layer base station via the lower-layer inter-station communication section, it switches the operating mode of its own host base station from the power saving mode to the normal operation mode, and when all of the wireless communication being performed by its own host base station has ended, it switches the operating mode of its own host base station to the power staving mode.

Moreover, in the wireless communication system according to the present invention, the upper-layer control section of the wireless communication system determines whether or a lower-layer base station that satisfies the communication connection preconditions is present based on terminal attribute information that can be acquired by communicating with the wireless terminal Moreover, in the wireless communication system according to the present invention, if, based on position information relating to the wireless terminal that was acquired as the terminal attribute information, the wireless terminal that is currently performing communication is judged to be positioned within the lower-layer cell of one of the lower-layer base stations, the upper-layer control section of the wireless communication system determines that the lower-layer base station is a lower-layer base station that satisfies the communication connection preconditions. Moreover, in the wireless communication system according to the present invention, if, based on the type of communication and on the position information relating to the wireless terminal that were acquired as the terminal attribute information, the type of communication is judged to be data communication, and the relevant wireless terminal is judged to be positioned within the lower-layer cell of one of the lower-layer base stations, the upper-layer control section of the wireless communication system determines that the lower-layer base station is a lower-layer base station that satisfies the communication connection preconditions.

Moreover, in the wireless communication system according to the present invention, if the type of communication is audio communication, then irrespective of the position information, the upper-layer control section of the wireless communication system determines that no lower-layer base station that satisfies the communication connection preconditions is present.

Moreover, in the wireless communication system according to the present invention, if, based on the operating frequency and on the position information relating to the wireless terminal that were acquired as the terminal attribute information, one of the lower-layer base stations is judged to be capable of dealing with the operating frequency of the wireless terminal, and the relevant wireless terminal is judged to be positioned within the lower-layer cell of that lower-layer base station, then the upper-layer control section of the wireless communication system determines that the lower-layer base station is a lower-layer base station that satisfies the communication connection preconditions.

Moreover, in the wireless communication system according to the present invention, if no lower-layer base station that is capable of dealing with the operating frequency of the wireless terminal is present, then irrespective of the position information, the upper-layer control section of the wireless communication system determines that no lower-layer base station that satisfies the communication connection preconditions is present.

Moreover, in the wireless communication system according to the present invention, if the communication load of the upper-layer base station exceeds a specified value, the upper-layer control section of the wireless communication system determines whether or not a lower-layer base station that satisfies the communication connection preconditions is present.

Effects of the Invention

According to the present invention, because only those lower-layer base stations that are determined by an upper-layer base station to have satisfied the preconditions for making a connection in order to communicate with wireless terminals that are currently communicating are switched from a power saving mode to a normal operation mode, it is possible to minimize the power consumption of the system as a whole.

EMBODIMENTS FOR CARRYING OUT THE INVENTION

Hereinafter, an embodiment of the present invention will be described with reference made to the drawings.

Figure 1:
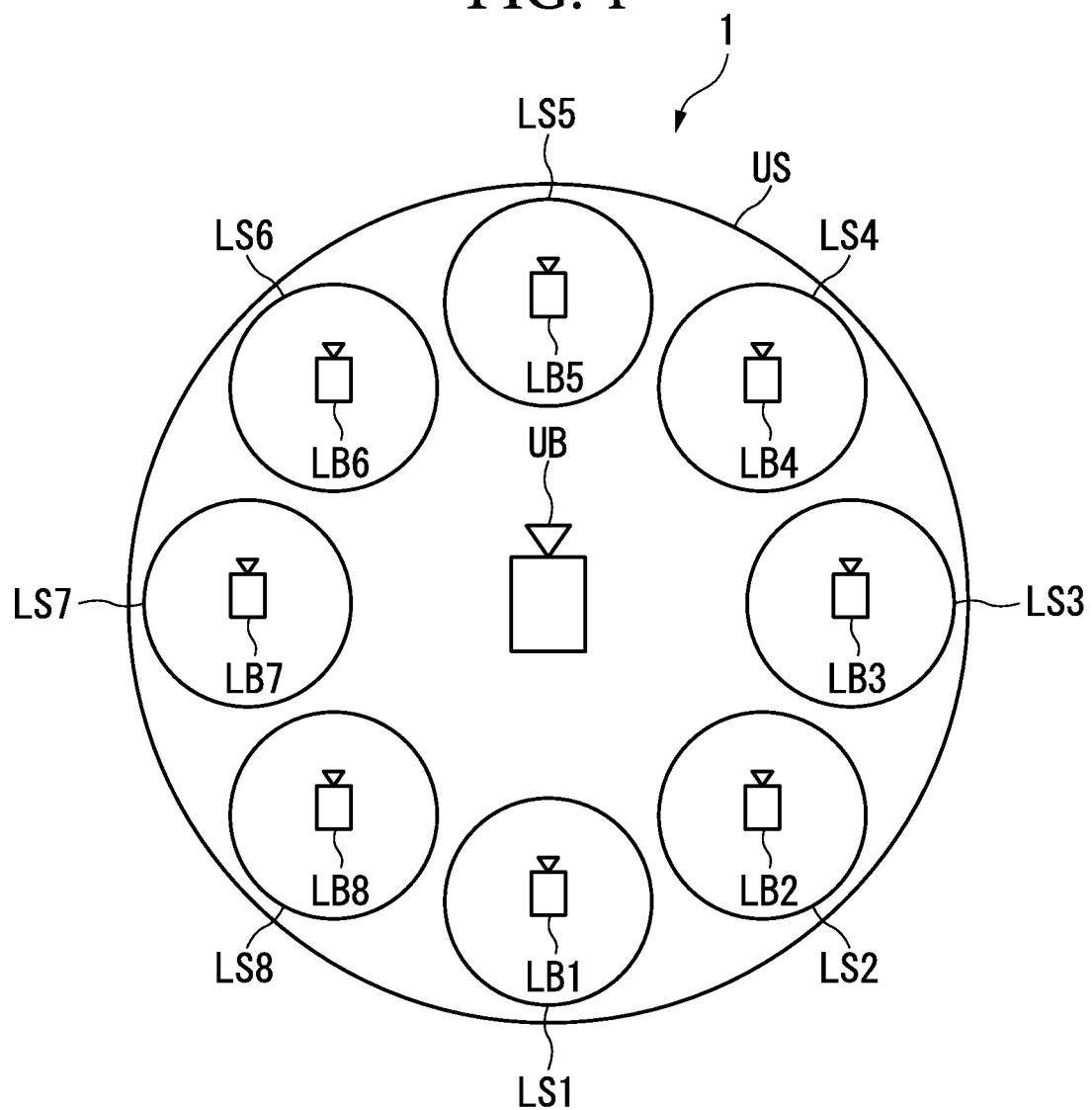
FIG. 1 is a block structural view of a wireless communication system 1 according to an embodiment of the present invention

FIG. 1 is a schematic structural view of a wireless communication system 1 of the present embodiment. As is shown in FIG. 1, the wireless communication system 1 is, for example, an LTE (Long Term Evolution) system that is based on LTE, which is a next generation high-speed communication standard, and employs a heterogeneous network in which a plurality (eight in the present embodiment) of lower-layer cells LS1 to LS8 are located within an upper-layer cell US.

LTE systems employ OFDMA (Orthogonal Frequency Division Multiple Access) for downlink communication, and SC-FDMA (Single Carrier Frequency Division Multiple Access) for uplink communication. Furthermore, LTE systems allocate wireless resources in RB (Resource Block) units to user terminals. RB are the smallest allocation units for wireless resources and are made up, for example, of a bandwidth (=180 kHz) for 12 subcarriers, and a time width (=a slot length of 0.5 ms) for 7 symbols.

In a high-speed wireless communication system such as this LTE system, a heterogeneous network is formed in order to improve throughput. By doing this, the S/N ratio is secured, and the load on the base station is distributed. In the present embodiment, a macrocell having a cell radius of between approximately several kilometers and several tens of kilometers is hypothesized as the upper-layer cell US. Furthermore, microcells having a cell radius of between approximately several hundred meters and one kilometer are hypothesized as the lower-layer cells LS1 to LS8. Note that femtocells or picocells or the like which are smaller than microcells may also be used for the lower-layer cells LS1 to LS8.

This type of wireless communication system 1 is provided with an upper-layer base station UB that forms the upper-layer cell US, and eight lower-layer base stations LB1 to LB8 that form the respective lower-layer cells LS1 to LS8. The upper-layer base station UB is able to perform wireless communication with wireless terminals (not shown) that are present within the upper-layer cell US. Furthermore, the upper-layer base station UB is connected to each of the lower-layer base stations LB1 to LB8 via communication cables C (not shown). The upper-layer base station UB is able to communicate with each one of the lower-layer base stations LB1 to LB8. Moreover, each lower-layer base stations LB1 to LB8 is able to wirelessly communicate with wireless terminals (not shown) that are present within the areas of their own respective lower-layer cells LS1 to LS8.

Note that in the following description, when it is not necessary to make distinctions between the individual lower-layer base stations LB1 to LB8, in order to simplify the explanation they are referred to simply as lower-layer base stations LB. Moreover, when it is not necessary to make distinctions between the individual lower-layer cells LS1 to LS8, they are referred to simply as lower-layer cells LS.

Figure 2:
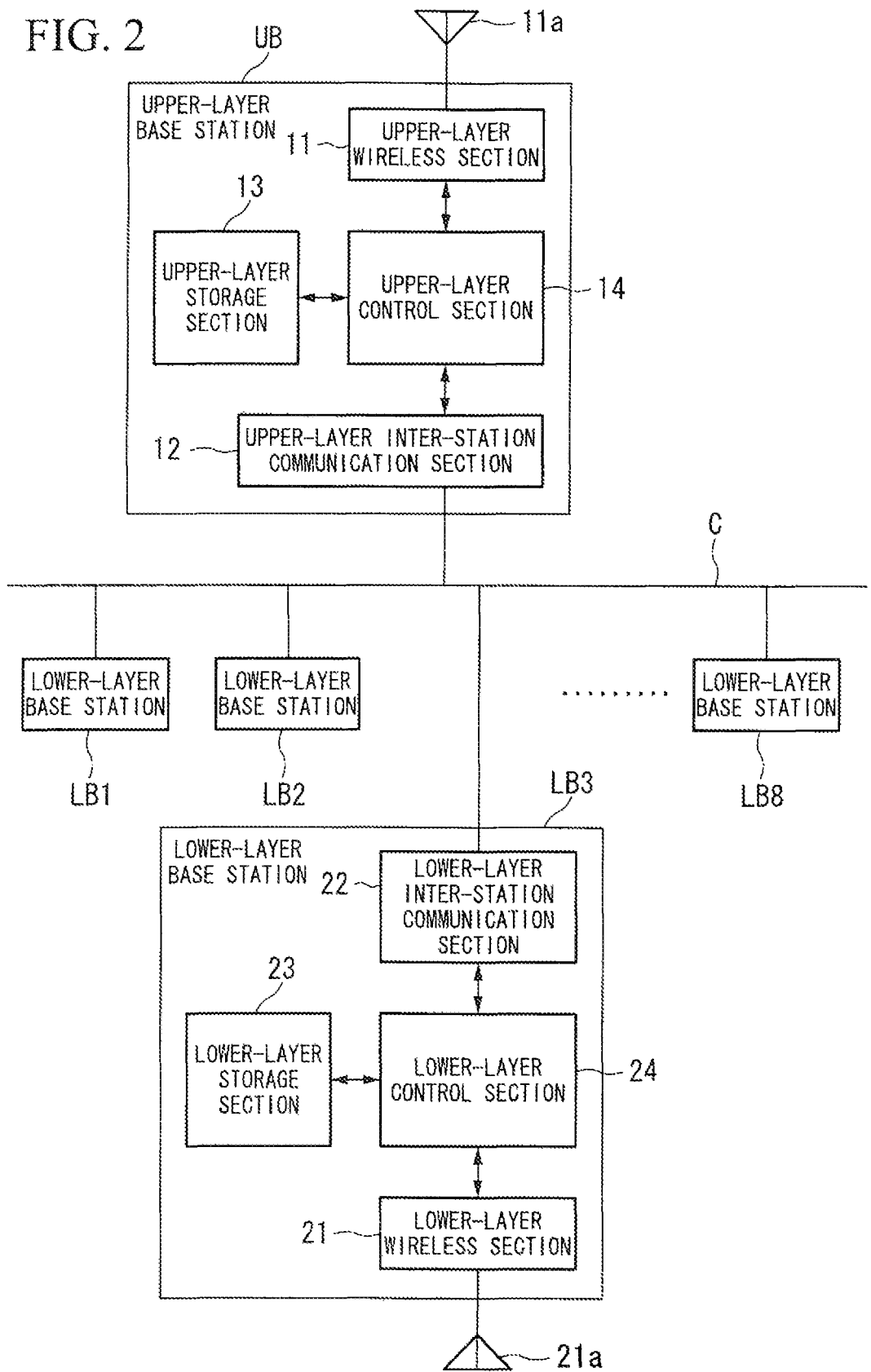
FIG. 2 is an internal block structural diagram of an upper-layer base station UB and lower-layer base stations LB1 to LB8.

FIG. 2 is an internal block structural diagram of the upper-layer base station UB and the lower-layer base stations LB1 to LB8.

Note that, in FIG. 2, the lower-layer base station LB3 is used as an example in order to describe the internal structure of the lower-layer base stations LB. The other lower-layer base stations LB are also provided with the same type of internal structure as the lower-layer base station LB3. As is shown in FIG. 2, the upper-layer base station UB is provided with an upper-layer wireless section 11, an upper-layer inter-station communication section 12, an upper-layer storage section 13, and an upper-layer control section 14. The lower-layer base station LB3 is provided with a lower-layer wireless section 21, a lower-layer inter-station communication section 22, a lower-layer storage section 23, and a lower-layer control section 24.

In the upper-layer base station UB, the upper-layer wireless section 11 is controlled by the upper-layer control section 14. When the upper-layer wireless section 11 performs downlink communication with wireless terminals that are present within the communication area of the upper-layer cell US, it uses OFDMA. When the upper-layer wireless section 11 performs uplink communication with wireless terminals, it uses SC-FDMA. By doing this, the upper-layer wireless section 11 is able to achieve wireless communication with wireless terminals that are present within the communication area of the upper-layer cell US. Specifically, when performing downlink communication, the upper-layer wireless section 11 creates an OFDM signal for use in transmissions from a baseband signal that is input from the upper-layer control section 14. The upper-layer wireless section 11 also transmits this created OFDM signal to a wireless terminal via an antenna 11a. When performing uplink communication, the upper-layer wireless section 11 converts an SC-FDM signal that was received from a wireless terminal via the antenna 11a into a baseband signal. The upper-layer wireless section 11 then outputs the converted signal to the upper-layer control section 14.

The upper-layer inter-station communication section 12 is connected to the lower-layer inter-station communication sections 22 of the respective lower-layer base stations LB1 through LB8 via the communication cable C. By doing this, the upper-layer inter-station communication section 12 is able to communicate with the lower-layer inter-station communication sections 22 of the respective lower-layer base stations LB1 through LB8. The upper-layer inter-station communication section 12 achieves wired communication with the respective lower-layer base stations LB1 through LB8 via the control of the upper-layer control section 14. Base station control programs that are executed by the upper-layer control section 14 and various types of setting data are stored in advance in the upper-layer storage section 13. The upper-layer storage section 13 also functions as a buffer for buffering packet data.

The upper-layer control section 14 controls the collective communication operations of the upper-layer base station UB in accordance with the base station control programs that are stored in the upper-layer storage section 13. Moreover, the upper-layer control section 14 is able to search for lower-layer base stations LB that satisfy communication connection preconditions for establishing connections in order to communicate with wireless terminals that are currently performing communication, and to transmit a command via the upper-layer inter-station communication section 12 to switch (hereinafter, this will be referred to simply as a mode switching command) from a power saving mode to a normal operation mode to the lower-layer base stations LB that satisfy the communication connection preconditions. Note that one of the communication connection preconditions is the precondition that a wireless terminal that is currently performing communication is positioned within the communicable area of the lower-layer base station LB (i.e., the lower-layer cell LS).

Note that, in the present embodiment, the upper-layer control section 14 acquires terminal attribute information as a result of communicating with a wireless terminal. Based on this information, the upper-layer control section 14 determines whether or not a lower-layer base station LB that satisfies the communication connection preconditions is present. Specifically, the upper-layer control section 14 acquires position information for the wireless terminals as the aforementioned terminal attribute information. Based on this position information, the upper-layer control section 14 determines whether or not there is a lower-layer cell LS that corresponds to the position of a wireless terminal that is currently performing communication. If there is a corresponding lower-layer cell LS, namely, if, based on the acquired position information, the upper-layer control section 14 determines that a wireless terminal that is currently performing communication is positioned within the lower-layer cell LS of the lower-layer base station LB, the upper-layer control section 14 judges this lower-layer base station LB to be a lower-layer base station LB that satisfies the communication connection preconditions. The lower-layer base station LB of the lower-layer cell LS is judged to be a lower-layer base station LB that satisfies the communication connection preconditions. Note that, in addition to the position information of wireless terminals that are currently performing communication, the terminal attribute information may also include the communication type, namely, whether the communication is audio communication or data communication or the like, and the operating frequency of the wireless terminal and the like.

In contrast, in the lower-layer base station LB3 (the same applies to the other lower-layer base stations LB), the lower-layer wireless section 21 is controlled by the lower-layer control section 24. When the lower-layer wireless section 21 performs downlink communication with a wireless terminal under the control of the lower-layer control section 24, it uses OFDMA. When the lower-layer wireless section 21 performs uplink communication with a wireless terminal, it uses SC-FDMA. By doing this, the lower-layer wireless section 21 is able to achieve wireless communication with a wireless terminal that is present within the lower-layer cell LS3. Specifically, when performing downlink communication, the lower-layer wireless section 21 creates an OFDM signal for use in transmissions from a baseband signal that is input from the lower-layer control section 24. The lower-layer wireless section 21 also transmits this created OFDM signal to a wireless terminal via an antenna 21a. When the lower-layer wireless section 21 performs downlink communication with a wireless terminal, it uses OFDMA, and when the lower-layer wireless section 21 performs uplink communication with a wireless terminal, it uses SC-FDMA. By doing this, the lower-layer wireless section 21 is able to achieve wireless communication with a wireless terminal that is present within the lower-layer cell LS3. Specifically, when performing downlink communication with a wireless terminal, the lower-layer wireless section 21 creates an OFDM signal for use in transmissions from a baseband signal that is input from the lower-layer control section 24. The lower-layer wireless section 21 also transmits this created OFDM signal to a wireless terminal via an antenna 21a. Moreover, when performing uplink communication with a wireless terminal, the lower-layer wireless section 21 converts an SC-FDM signal that was received from a wireless terminal via the antenna 21a into a baseband signal. The lower-layer wireless section 21 then outputs the converted signal to the lower-layer control section 24.

The lower-layer inter-station communication section 22 is connected to the upper-layer inter-station communication section 12 of the upper-layer base station UB via the communication cable C such that it is able to communicate with the upper-layer inter-station communication section 12. The lower-layer inter-station communication section 22 is controlled by the lower-layer control section 24. By doing this, the lower-layer inter-station communication section 22 achieves wired communication with the upper-layer base station UB. Base station control programs that are executed by the lower-layer control section 24 and various types of setting data are stored in advance in the lower-layer storage section 23. The lower-layer storage section 23 also functions as a buffer for buffering packet data.

The lower-layer control section 24 controls the collective communication operations of the lower-layer base station LB3 in accordance with the base station control programs that are stored in the lower-layer storage section 23. Moreover, when the lower-layer control section 24 receives a mode switching command from the upper-layer base station UB via the lower-layer inter-station communication section 22, it switches its the operating mode of its own host base station from the power saving mode to the normal operation mode. When the communication with the wireless terminal via the lower-layer wireless section 21 has ended, the lower-layer control section 24 is then able to switch the operating mode of its own host base station back to the power saving mode.

Note that in the present embodiment, in the power saving mode, the supply of power to the lower-layer wireless section 21 is stopped so as to render the wireless communications of the lower-layer wireless section 21 inoperable (i.e., such that it is unable to transmit or receive radio waves). Furthermore, in power saving mode, the lower-layer control section 24 is restricted so that it is only able to wait (i.e., to implement a standby function) for a mode switching command from the upper-layer base station UB. Namely, because most of the power of the lower-layer base station LB3 in power saving mode is consumed by the standby function for waiting for the mode switching command from the lower-layer control section 24, the amount of power consumed by the lower-layer base station LB3 is extremely small.

Next, communication operations of the above-described upper-layer base station UB and lower-layer base stations LB will be described in detail. (Communication operations of the upper-layer base station UB)

Figure 3:
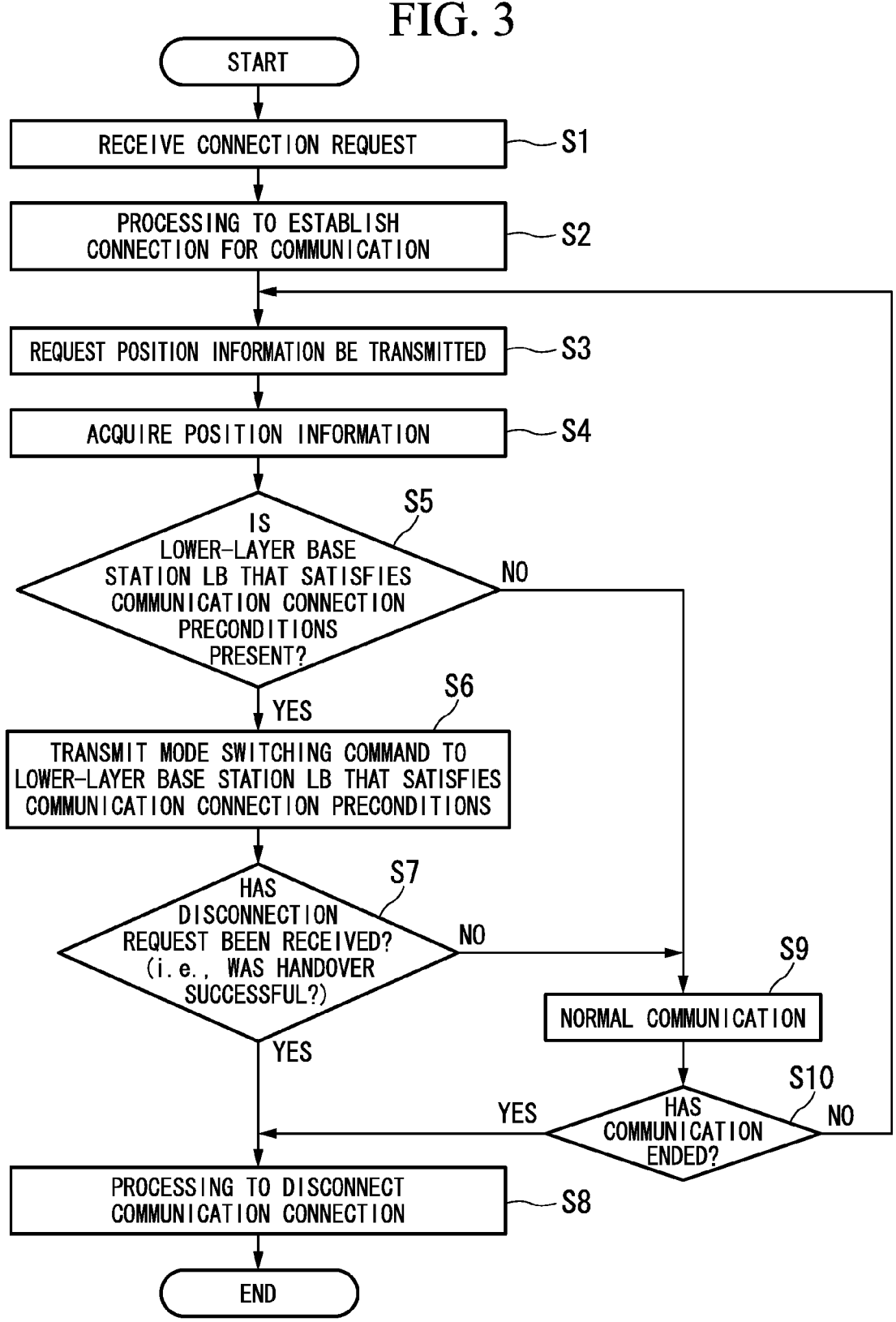
FIG. 3 is a flowchart showing a communication operation of the upper-layer base station UB.

Firstly, the communication operations of the upper-layer base station UB will be described. FIG. 3 is a flowchart showing the communication operations of the upper-layer base station UB. As is shown in FIG. 3, when the upper-layer control section 14 of the upper-layer base station UB receives a connection request from a wireless terminal via the upper-layer wireless section 11 (step S1), it establishes a connection for communication with the wireless terminal that transmitted that connection request (step S2).

When the connection for communication with the wireless terminal has been established via step S2, the upper-layer control section 14 transmits a position information transmission request to that wireless terminal via the upper-layer wireless section 11 (step S3). This position information transmission request is a signal whose purpose is to request that a wireless terminal transmit position information which shows its current position. The wireless terminal is provided with a function of detecting position information about itself such as, for example, a GPS (Global Positioning System) function. In accordance with the above-described position information transmission request, the wireless terminal then transmits position information which shows its own current position to the upper-layer base station UB.

When the upper-layer control section 14 acquires the position information from the wireless terminal via the upper-layer wireless section 11 (step S4), based on the acquired position information, it determines whether or not a lower-layer base station LB that satisfies the communication connection preconditions with that wireless terminal is present (step S5). Specifically, if, based on the acquired position information, a wireless terminal that is currently performing communication is judged to be positioned within the lower-layer cell LS of a lower-layer base station LB, the upper-layer control section 14 determines that the lower-layer base station LB satisfies the communication connection preconditions.

If the result of the determination in step S5 is YES, namely, if a lower-layer base station LB that satisfies the communication connection preconditions is present, the upper-layer control section 14 transmits a mode switching command via the upper-layer inter-station communication section 12 to the lower-layer base station LB that satisfies the communication connection preconditions (step S6). If, however, the result of the determination in step S5 is NO, namely, if a lower-layer base station LB that satisfies the communication connection preconditions is not present, the upper-layer control section 14 proceeds to the subsequent step S8 without transmitting the mode switching command.

The upper-layer control section 14 determines whether or not a disconnection request has been received (in other words, whether or not the handover was successful) from the wireless terminal that is currently performing communication (step S7). If the result of the determination in step S7 is YES, the upper-layer control section 14 disconnects the communication connection with the wireless terminal that is currently performing communication (step S8). If, on the other hand, the result of the determination in step S5 is NO, or if the result of the determination in step S7 is NO, the upper-layer control section 14 continues to maintain the communication connection with the wireless terminal, and performs normal communication operations (for example, performs audio communication or data communication) (step S9).

Furthermore, the upper-layer control section 14 also determines whether or not communication with the wireless terminal has ended (step S10). If the result of the determination in S10 is NO, the upper-layer control section 14 reacquires the position information (step S3). If, however, the result of the determination in step S10 is YES, the upper-layer control section 14 performs processing to disconnect the communication connection with the wireless terminal (step S8).

The upper-layer control section 14 repeatedly implements the above-described steps S1 through S10 each time a connection request is received from a wireless terminal. Namely, when a connection for communication with a wireless terminal is established, the upper-layer base station UB determines whether or not a lower-layer base station LB that satisfies the preconditions for making a communication connection with that wireless terminal is present. If a lower-layer base station LB that satisfies the communication connection preconditions is not present, the upper-layer control section 14 implements communication with a wireless terminal via its own host base station, and until this communication is ended, repeatedly determines whether or not a lower-layer base station LB that does satisfy the communication connection preconditions is present (because there is a possibility that the wireless terminals will move).

If a lower-layer base station LB that does satisfy the communication connection preconditions is present, the upper-layer base station UB transmits a mode switching command to that lower-layer base station LB. By doing this, the upper-layer base station UB is able to switch the operating mode of the relevant lower-layer base station LB from a power saving mode to a normal operation mode. Here, because the wireless terminal is present within the lower-layer cell LS of the lower-layer base station LB that has progressed to normal operation mode, it makes a handover to that lower-layer base station LB. If the handover is successful, the wireless terminal transmits a disconnection request to the upper-layer base station UB. When the upper-layer base station UB receives the disconnection requests from the wireless terminal, it regards the handover as having been successful, and disconnects the communication connection with the wireless terminal.

(Communication Operations of the Lower-layer Base Station LB)

Figure 4A:
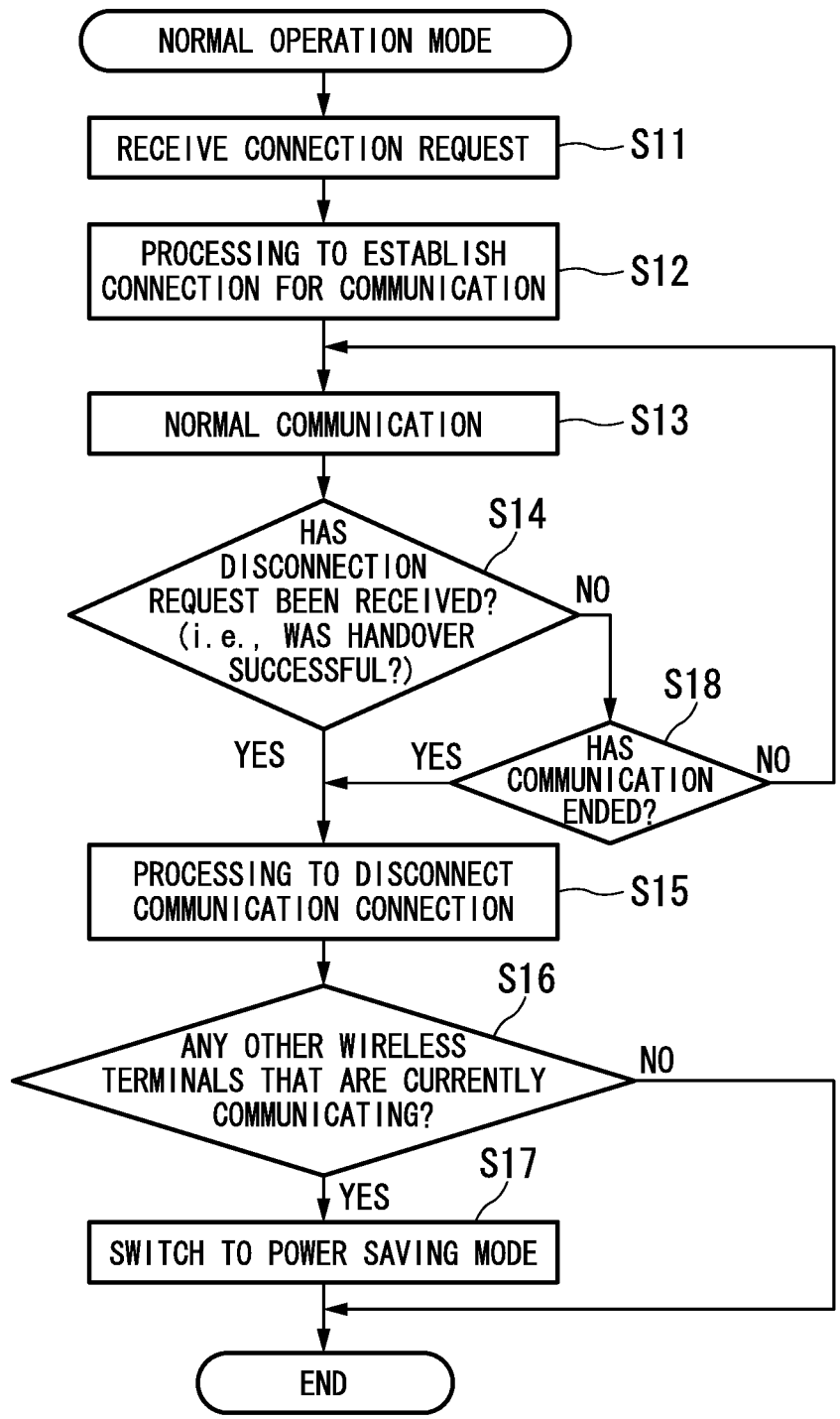
FIG. 4A is a flowchart showing a communication operation in a normal operation mode of a lower-layer base station LB.
Figure 4B:
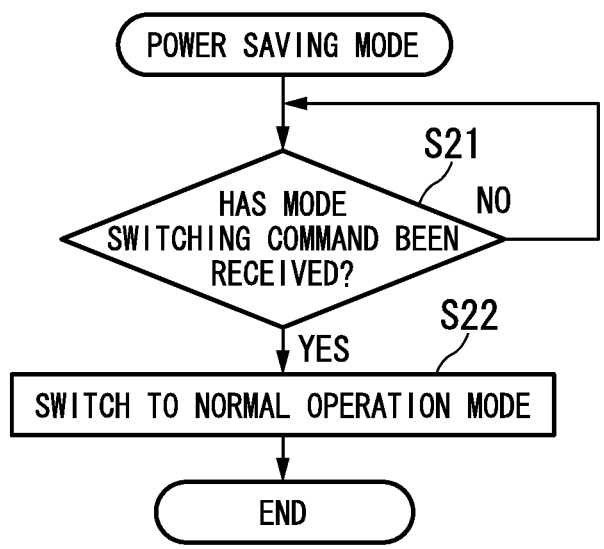
FIG. 4B is a flowchart showing a communication operation in a power saving mode of a lower-layer base station LB.

Communication operations of the lower-layer base station LB will now be described. FIG. 4A is a flowchart showing the communication operations of the lower-layer base station LB in normal operation mode. FIG. 4B is a flowchart showing the communication operations in power saving mode (i.e., in standby operation mode).

As is shown in FIG. 4A, in the normal operation mode of the lower-layer base station LB, when the lower-layer control section 24 of the lower-layer base station LB receives a connection request from a wireless terminal via the lower-layer wireless section 21 (step S11), it performs processing to establish a connection for communication with the wireless terminal that transmitted that connection request (step S12). The lower-layer control section 24 then performs normal communication operations with the wireless terminal that established the communication connection (step S13). Note that the connection request of step S11 includes connection requests that are transmitted to the lower-layer base station LB from the wireless terminal during a handover.

The lower-layer control section 24 determines whether or not a disconnection request has been received (in other words, whether or not the handover was successful) from the wireless terminal that is currently performing communication (step S14). If the result of the determination in step S14 is YES, the lower-layer control section 24 disconnects the communication connection with the wireless terminal that is currently performing communication (step S15). The lower-layer control section 24 also determines whether or not it is currently communicating with any other wireless terminals (in other words, whether or not all wireless communication being performed by its own host base station has ended) (step S16). If the result of the determination in step S16 is YES, the lower-layer control section 24 switches the operating mode of its own host base station to power saving mode (step S17), while if the result of the determination in step S16 is NO, the lower-layer control section 24 maintains the operating mode of its own host base station as the normal operation mode.

If, however, the result of the determination in S14 is NO, the lower-layer control section 24 determines whether or not communication with the wireless terminal has ended (step S18). If the result of the determination in step S18 is NO, the lower-layer control section 24 continues the communication with the wireless terminal (step S13). If the result of the determination in step S18 is YES, the lower-layer control section 24 performs processing to disconnect the communication connection with the wireless terminal (step S15).

The lower-layer control section 24 repeatedly implements the above-described steps S11 through S18 each time a connection request is received from a wireless terminal while it is in normal operation mode. Namely, when the lower-layer base station LB receives a connection request from a terminal while in normal operation mode, it performs normal communication by establishing a connection for communication with that wireless terminal, and when all of the wireless communication performed by itself has ended, it switches its own operating mode to the power saving mode (FIG. 4B). By doing this, the lower-layer base station LB is able to hold its own level of power consumption to a minimum.

As is shown in FIG. 4B, in power saving mode, the lower-layer control section 24 of the lower-layer base station LB determines whether or not a mode switching command has been received via the lower-layer inter-station communication section 22 from the upper-layer base station UB (step S21). If the result of the determination in step S21 is NO, the lower-layer control section 24 repeats the processing of step S21. If, however, the result of the determination in step S21 is YES, namely, if a mode switching command has been received from the upper-layer base station UB, the lower-layer control section 24 switches the operating mode of its own host base station to the normal operation mode (FIG. 4A) (step S22). Note that, when the lower-layer control section 24 has received a mode switching command, if it is already in normal operation mode, it takes no further action.

In this manner, because all the lower-layer base station LB does when in power saving mode is to perform a standby operation in which it waits for a mode switching command to be received, the level of power consumption of the lower-layer base station LB is extremely small.

(Specific Example of the Overall Communication Operations of the Wireless System 1 which Includes a Wireless Terminal)

Next, the communication operations of the above-described upper-layer base station UB and lower-layer base station LB, and the overall communication operations of the wireless communication system 1 which includes a wireless terminal will be described using a specific example. In this specific example, an initial state is hypothesized in which there are no wireless terminals present within the communication area of the upper-layer cell US, and each of the lower-layer base stations LB1 to LB8 is in power saving mode (with the upper-layer base station UB, however, being in normal operation mode). In this specific example, a case is hypothesized in which, from this initial state, a wireless terminal (hereinafter, referred to as the wireless terminal T) enters into the communication area of the lower-layer cell LS3, and thereafter, this wireless terminal T moves into the lower-layer cell LS4. This specific example is described in detail using FIG. 5, FIGS. 6A and 6B, and FIGS. 7A and 7B.

Figure 5:
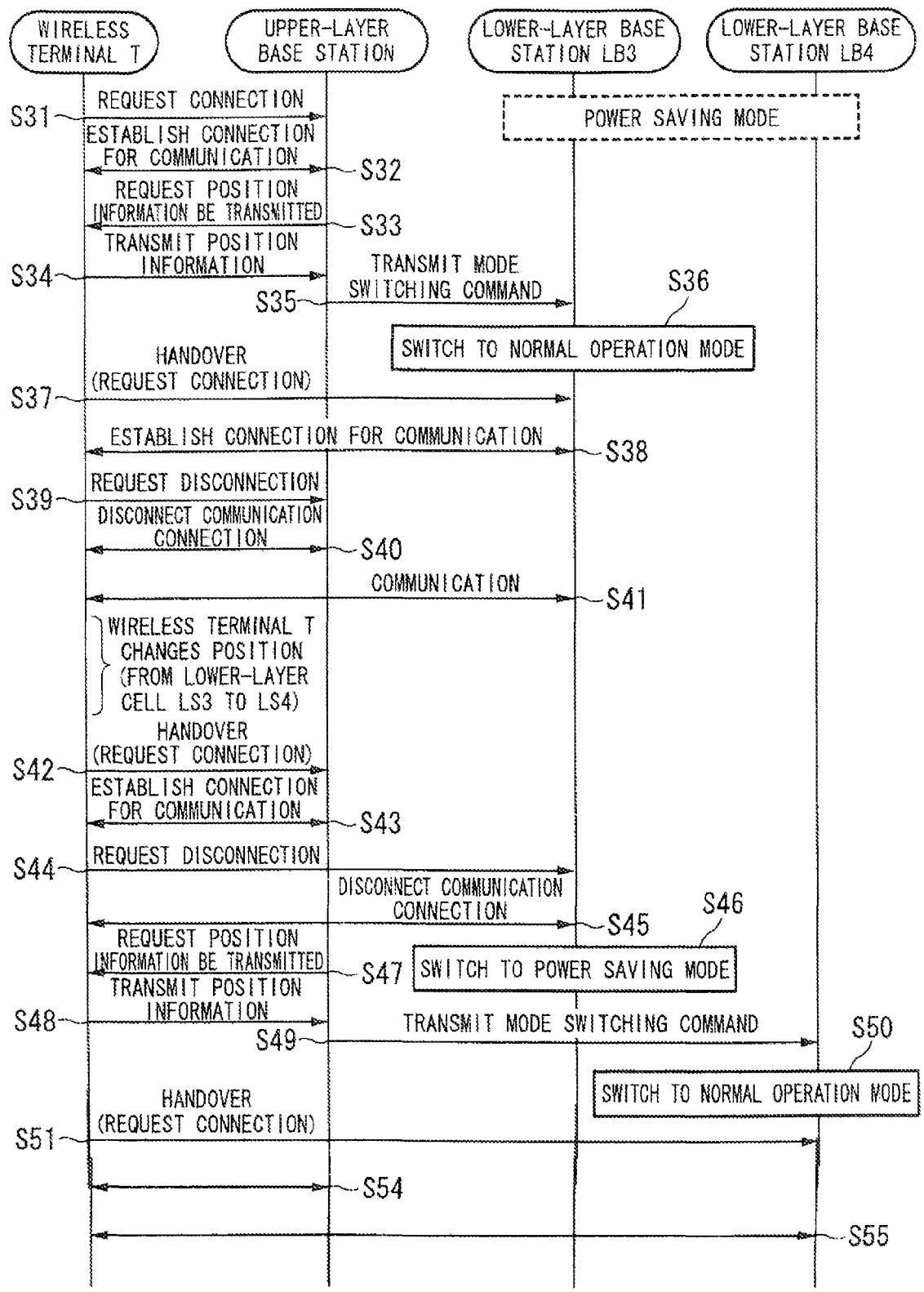
FIG. 5 is a sequence chart showing a specific example of the overall communication operations of the wireless communication system 1 including a wireless terminal.

FIG. 5 is a sequence chart showing mutual intercommunication between the wireless terminal T, the upper-layer base station UB, and the lower-layer base stations LB3 and LB4 in accordance with the above-described hypothesis. When the wireless terminal T enters the lower-layer cell LS3 (see FIG. 6A), it transmits a connection request to the upper-layer base station UB (step S31). When the upper-layer base station UB receives the connection request from the wireless terminal T, it establishes a connection for communication with the wireless terminal T (step S32). After the communication connection with the wireless terminal T has been established, the upper-layer base station UB transmits a position information transmission request to the wireless terminal T (step S33).

When the wireless terminal T receives the position information transmission request from the upper-layer base station UB, it transmits position information about its own current position which it has detected by means of a GPS function to the upper-layer base station UB (step S34). Based on the position information it has acquired from the wireless terminal T, the upper-layer base station UB determines that the lower-layer base station LB that is satisfying the communication connection preconditions is the lower-layer base station LB3, and transmits a mode switching command to the lower-layer base station LB3 (step S35).

Figure 6A:
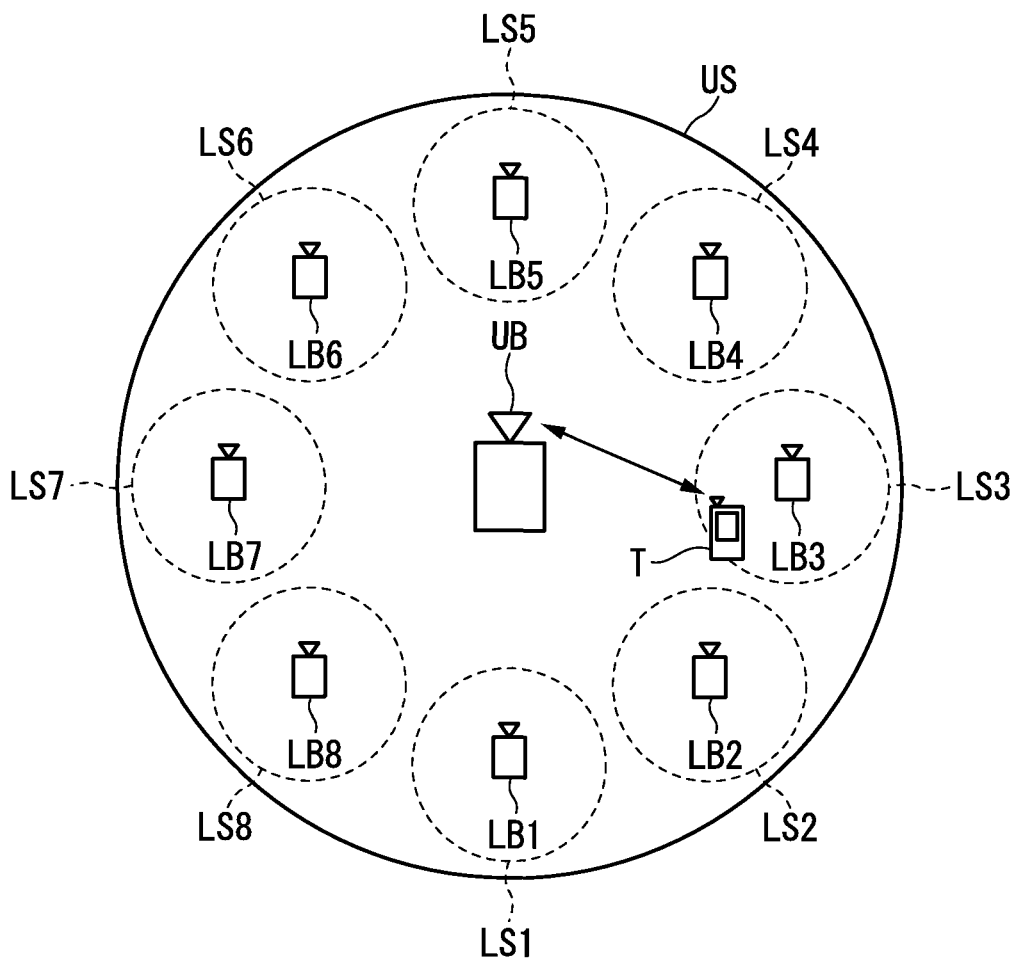
FIG. 6A is a supplementary explanatory view relating to a specific example of the overall communication operations of the wireless communication system 1 including a wireless terminal.
Figure 6A:
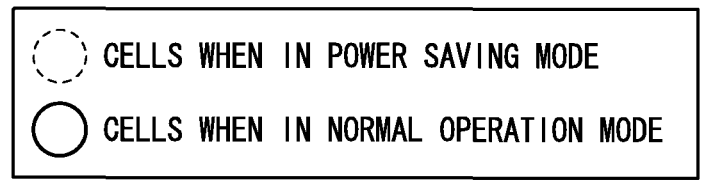
Figure 6B:
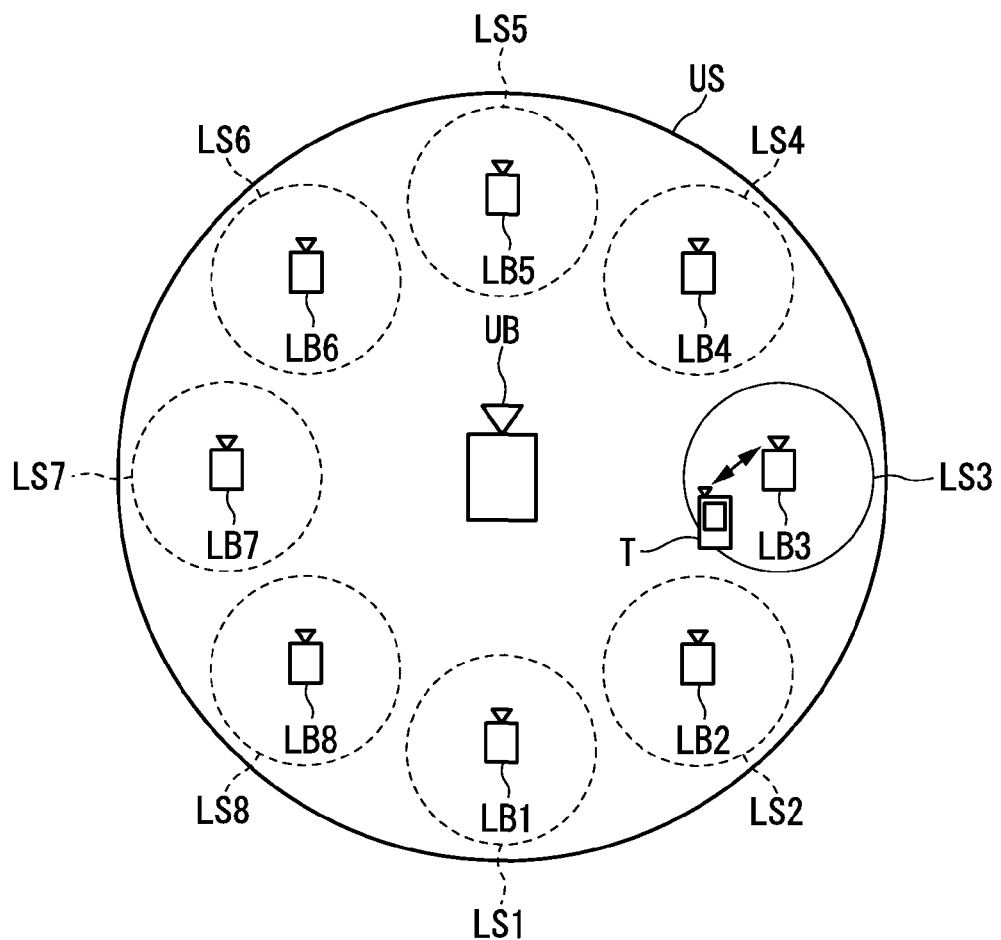
FIG. 6B is a supplementary explanatory view relating to a specific example of the overall communication operations of the wireless communication system 1 including a wireless terminal.

When the lower-layer base station LB3 receives the mode switching command from the upper-layer base station UB, it switches its own operating mode from the power saving mode to the normal operation mode (step S36: see FIG. 6B). Meanwhile, the upper-layer base station UB receives a report about the radio wave strength of peripheral base stations around the wireless terminal T, and decides to handover the wireless terminal T. A handover from the upper-layer base station UB to the lower-layer base station LB3 is then performed (step S37).

When the lower-layer base station LB3 receives the connection request from the wireless terminal T, it establishes a connection for communication with the wireless terminal T (step S38). After establishing the connection for communication with the lower-layer base station LB3, the wireless terminal T transmits a disconnection request to the upper-layer base station UB (step S39). When the upper-layer base station UB receives the disconnection request from the wireless terminal T, it disconnects the communication connection with the wireless terminal T (step S40). Thereafter, normal communication is conducted between the wireless terminal T and the lower-layer base station LB3 (step S41).

Figure 7A:
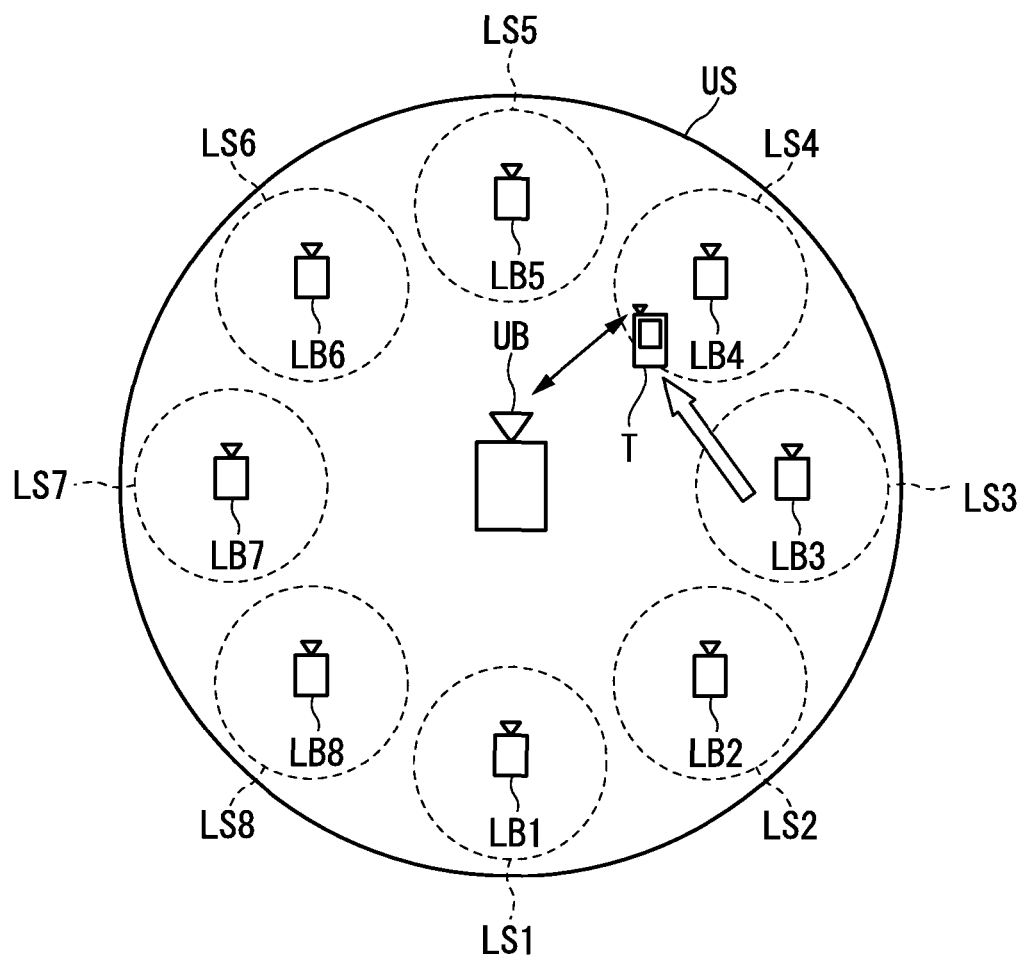
FIG. 7A is a supplementary explanatory view relating to a specific example of the overall communication operations of the wireless communication system 1 including a wireless terminal.
Figure 7A:
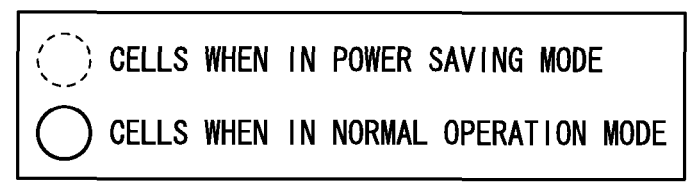

Furthermore, it is now hypothesized that, prior to the communication between the wireless terminal T and the lower-layer base station LB3 ending, the wireless terminal T moves from the lower-layer cell LS3 to the lower-layer cell LS4 (see FIG. 7A). In this case, the strength of the radio waves the wireless terminal T is receiving from the lower-layer base station LB3 decreases. The lower-layer base station LB3 receives a report about the radio wave strength of peripheral base stations around the wireless terminal T, and decides to handover the wireless terminal T. A handover from the lower-layer base station LB3 to the upper-layer base station UB is then performed (step S42).

When the upper-layer base station UB receives the connection request from the wireless terminal T, it establishes a connection for communication with the wireless terminal T (step S43). After establishing the connection for communication with the upper-layer base station UB, the wireless terminal T transmits a disconnection request to the lower-layer base station LB3 (step S44). When the lower-layer base station LB3 receives the disconnection request from the wireless terminal T, it disconnects the communication connection with the wireless terminal T (step S45). As a consequence of this, the lower-layer base station LB3 determines that all of its own wireless communication has ended, and switches its own operating mode to the power saving mode (step S46).

Meanwhile, the upper-layer base station UB transmits a position information transmission request to the wireless terminal T (step S47). The wireless terminal T transmits position information showing its own current position which it has detected by means of a GPS function to the upper-layer base station UB (step S48). Based on the position information it has acquired from the wireless terminal T, the upper-layer base station UB determines that the lower-layer base station LB that is satisfying the communication connection preconditions is the lower-layer base station LB4. The upper-layer base station UB then transmits a mode switching command to the lower-layer base station LB4 (step S49).

Figure 7B:
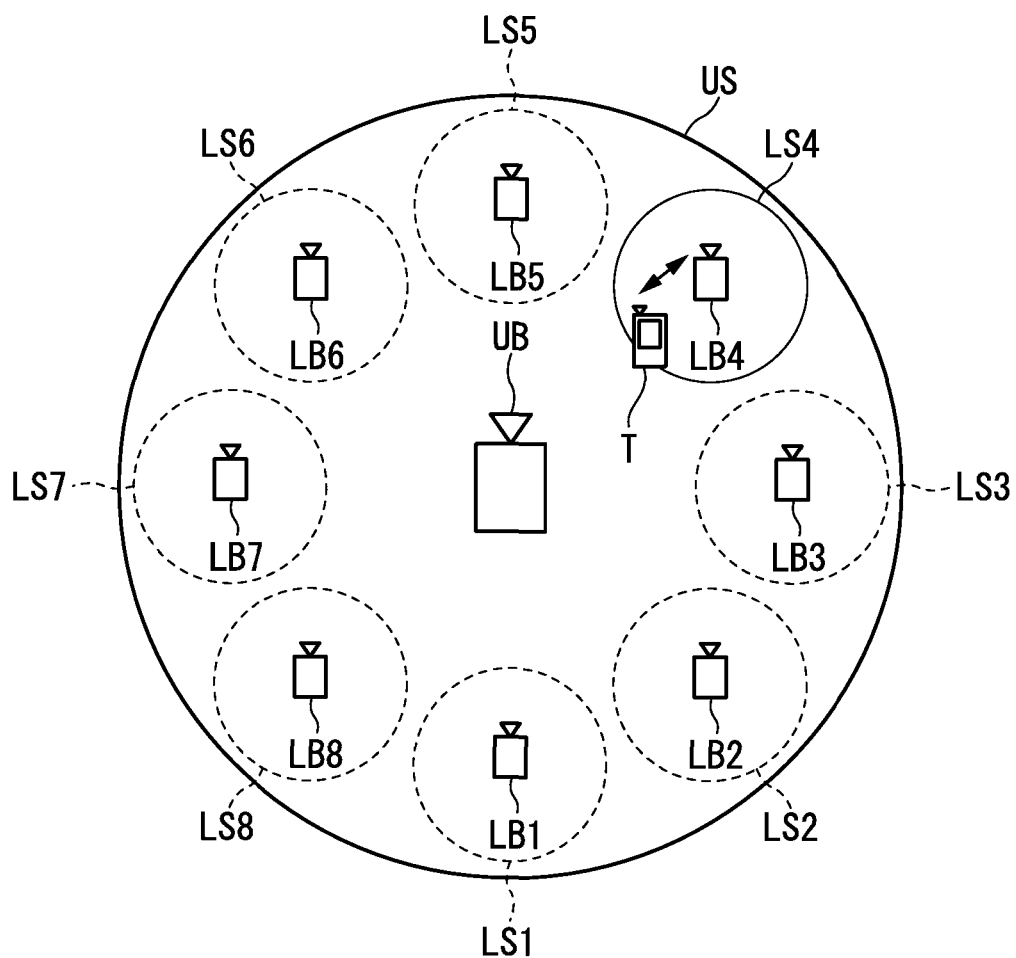
FIG. 7B is a supplementary explanatory view relating to a specific example of the overall communication operations of the wireless communication system 1 including a wireless terminal.
Figure 7B:
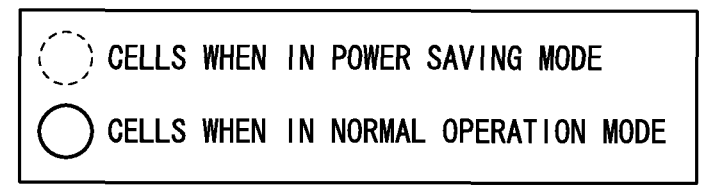

When the lower-layer base station LB4 receives the mode switching command from the upper-layer base station UB, it switches its own operating mode from the power saving mode to the normal operation mode (step S50: see FIG. 7B). The upper-layer base station UB receives a report about the radio wave strength of peripheral base stations around the wireless terminal T, and decides to handover the wireless terminal T. As a result, a handover from the upper-layer base station UB to the lower-layer base station LB4 is performed (step S51).

When the lower-layer base station LB4 receives the connection request from the wireless terminal T, it establishes a connection for communication with the wireless terminal T (step S52). After establishing the connection for communication with the lower-layer base station LB4, the wireless terminal T transmits a disconnection request to the upper-layer base station UB (step S53). When the upper-layer base station UB receives the disconnection request from the wireless terminal T, it disconnects the communication connection with the wireless terminal T (step S54). Thereafter, normal communication is conducted between the wireless terminal T and the lower-layer base station LB4 (step S55).

Thereafter, in the same way, when the wireless terminal T moves from the lower-layer cell LS4, a connection for communication between the upper-layer base station UB and the wireless terminal T is temporarily established. At this time, the lower-layer base station LB4 returns to power saving mode. If a lower-layer base station LB that satisfies the preconditions for establishing a communication connection with the wireless terminal T is then discovered, that lower-layer base station LB is restored to normal operating mode, and a connection for communication with the wireless terminal T is established.

As has been described above, according to the present embodiment, because only lower-layer base stations LB that have been judged by an upper-layer base station UB as satisfying preconditions for making a connection for communication with a wireless terminal T that is currently communicating are switched from power saving mode to normal operation mode, it is possible to limit the power consumption of the overall system to an absolute minimum.

Note that the present invention is not limited to the above described embodiments, and the following variant examples may also be suggested.

(1) In the above described embodiment, a description has been given of a case in which it is assumed that the wireless terminal T is provided with a GPS function, and that position information detected by this GPS function is acquired from the wireless terminal T, however, it is not essential for all of the wireless terminals T to be provided with a GPS function. In this case, the upper-layer base station UB may be provided with the function of detecting information analogous to position information for the wireless terminal T, for example, the distance to the wireless terminal T, the direction in which the wireless terminal T is positioned, and the like.

(2) In the above described embodiment, a case has been described in which the position information is acquired in the upper-layer base station UB as terminal attribute information for the wireless terminal T, and, based on this position information, the upper-layer base station UB determines that the lower-layer base station LB of the lower-layer cell LS where the wireless terminal T is present is a lower-layer base station LB that satisfies the communication connection preconditions. Furthermore, for example, in addition to this position information, the communication type, which indicates whether the communication being sought by the wireless terminal T is audio communication or data communication, may also be acquired as terminal attribute information.

In this case, the upper-layer control section 14 determines that a lower-layer base station LB satisfies the communication connection preconditions based on the communication type and position information that were acquired as terminal attribute information. For example, if the communication type of the wireless terminal T which is currently performing communication is data communication, and that wireless terminal T is positioned within the communication area of the lower-layer cell LS of one of the lower-layer base stations LB, then the upper-layer control section 14 determines that the lower-layer base station LB of the lower-layer cell LS where the wireless terminal T is positioned is a lower-layer base station LB that satisfies the communication connection preconditions. In this case, if the communication type of the wireless terminal T is audio communication, then irrespective of the position information, the upper-layer control section 14 determines that no lower-layer base station LB that satisfies the communication connection preconditions is present.

Namely, if a wireless terminal T that is requesting data communication, which has a large communication traffic quantity, has accessed the upper-layer base station UB, then in conjunction with the increase in the number of accesses to the upper-layer base station UB, there is a considerable increase in the communication load on the upper-layer base station UB. In this case, the lower-layer base station LB to which that wireless terminal T can connect for communication (i.e., the lower-layer base station LB in whose lower-layer cell LS the wireless terminal T is positioned) is switched to normal operation mode, and the connection destination of that wireless terminal T is switched to the lower-layer base station LB. As a result of this, a distribution of the base station load over the entire system can be achieved.

If, on the other hand, if a wireless terminal T that is requesting audio communication, which has a small communication traffic quantity, has accessed the upper-layer base station UB, then even if there is a large number of accesses to the upper-layer base station UB, the communication load on the upper-layer base station UB does not become overly heavy. In this case, irrespective of the position of the wireless terminal T, the upper-layer control section 14 determines that no lower-layer base station LB that satisfies the communication connection preconditions is present (namely, it does not implement a switchover to normal operation mode). By doing this, it is possible to reduce the power consumption of the overall system even further.

(3) In the variant example of the above-described (2), a case has been described in which the communication type and the position information are acquired as terminal attribute information. In addition to this, it is also possible, for example, for the operating frequency of the wireless terminal T to be acquired together with the position information as terminal attribute information. In this case, based on the operating frequency and position information that were acquired as terminal attribute information, the upper-layer control section 14 determines that the lower-layer base station LB is able to deal with the operating frequency of the wireless terminal T which is currently performing communication, and that the relevant wireless terminal T is positioned within the lower-layer cell LS of one of the lower-layer base stations LB. In addition, if there is a lower-layer base station LB in which a wireless terminal T is positioned, the upper-layer control section 14 judges that lower-layer base station LB to be a lower-layer base station LB that satisfies the communication connection preconditions. Furthermore, in this case, if a lower-layer base station LB that is able to deal with the operating frequency of the wireless terminal T is not present, then irrespective of the position information of the wireless terminal T, the upper-layer control section 14 determines that no lower-layer base station LB that satisfies the communication connection preconditions is present.

Namely, because there is no certainty that all of the lower-layer base stations LB1 to LB8 will be able to deal with the operating frequency of the wireless terminal T, if no lower-layer base station LB that is able to deal with the operating frequency of the wireless terminal T is present, then irrespective of the position information, there is no switching to the normal operation mode. By doing this, it is possible to reduce the power consumption of the overall system even further.

(4) As has been described above, if the communication load on the upper-layer base station UB is not that great, then it is not absolutely essential for the lower-layer base station LB to switch to normal operation mode. Therefore, it is also possible to provide the upper-layer control section 14 with a function of determining whether or not a lower-layer base station LB that satisfies the communication connection preconditions is present when the communication load in the host station of that upper-layer control section 14 becomes greater than a specified value. By doing this, while the communication load on the upper-layer base station UB is less than the specified value, there is no switching of the lower-layer base station LB to normal operation mode, so that a further reduction in the power consumption of the overall system can be anticipated. Note that this type of function can be applied to each of the above-described embodiment, to a variant example of (2), and to a variant example of (3).

(5) In the above-described embodiment, a case is described in which a macrocell in which the radius of the cell communication area is between several kilometers and several tens of kilometers is hypothesized as the upper-layer cell US, and in which microcells in which the radius of the cell communication area is between several hundred meters and one kilometer are hypothesized as the lower-layer cells LS1 to LS8.

However, in the wireless communication system according to the present invention, the cell radii of the upper-layer cell US and the lower-layer cells LS1 to LS8 are not limited to the aforementioned numerical values, and neither is the number of lower-layer cells located within the upper-layer call US limited to eight. Namely, provided that the wireless communication system is one that employs a heterogeneous network in which a plurality of lower-layer cells LS are located within the upper-layer cell US, then the present invention can be applied to that system.

(6) In the above-described embodiment, an LTE system that is based on LTE, which is a next generation high-speed communication standard, is described as an example of a wireless communication system according to the present invention, however, the wireless communication system of the present invention is not limited to this and can also be applied to wireless communication systems that employ other communication standards that make use of multi-carrier communication such as WiMAX and the like.

Industrial Applicability

It is possible to provide an upper-layer base station, a lower-layer base station, and a wireless communication system that make it possible to hold the power consumption of an entire wireless communication system in which lower-layer cells are superimposed on an upper-layer cell to an absolute minimum.

1 . . . Wireless communication system
UB . . . Upper-layer base station
11 . . . Upper-layer wireless section
12 . . . Upper-layer inter-station communication section
13 . . . Upper-layer storage section
14 . . . Upper-layer control section
LB (LB1~LB8) . . . Lower-layer base stations
21 . . . Lower-layer wireless section
22 . . . Lower-layer inter-station communication section
23 . . . Lower-layer storage section
24 . . . Lower-layer control section
US . . . Upper-layer cell
LS (LS1~LS8) . . . Lower-layer cells
T . . . Wireless terminal

The invention claimed is:

1. An upper-layer base station that forms an upper-layer cell in a wireless communication system in which lower-layer cells are superimposed onto the upper-layer cell, comprising: an upper-layer wireless section configured to achieve communication with at least one wireless terminal that is present within the upper-layer cell; an upper-layer inter-station communication section configured to achieve communication with lower-layer base stations that form the lower-layer cells; and an upper-layer control section configured to, via the upper-layer inter-station communication section, command any one of the lower-layer base stations that satisfies preconditions for making a connection in order to communicate with a wireless terminal that is currently performing communication to switch from a power saving mode to a normal operation mode, wherein, if, based on the operating frequency and on the position information relating to the wireless terminal that were acquired by communicating with the wireless terminal, one of the lower-layer base stations is judged to be capable of dealing with the operating frequency of the wireless terminal, and the wireless terminal is judged to be positioned within the lower-layer cell of that lower-layer base station, then the upper-layer control section determines that the lower-layer base station is a lower-layer base station that satisfies the communication connection preconditions.

2. The upper-layer base station according to claim 1, wherein, if, based on the position information relating to the wireless terminal, the wireless terminal that is currently performing communication is judged to be positioned within the lower-layer cell of one of the lower-layer base stations, the upper-layer control section determines that the lower-layer base station is a lower-layer base station that satisfies the communication connection preconditions.

3. The upper-layer base station according to claim 1, wherein, if, based on the type of communication and on the position information relating to the wireless terminal, the type of communication is judged to be data communication, and the wireless terminal is judged to be positioned within the lower-layer cell of one of the lower-layer base stations, the upper-layer control section determines that the lower-layer base station is a lower-layer base station that satisfies the communication connection preconditions.

4. The upper-layer base station according to claim 3, wherein, if the type of communication is audio communication, then irrespective of the position information, the upper-layer control section determines that no lower-layer base station that satisfies the communication connection preconditions is present.

5. The upper-layer base station according to claim 1, wherein, if no lower-layer base station that is capable of dealing with the operating frequency of the wireless terminal is present, then irrespective of the position information, the upper-layer control section determines that no lower-layer base station that satisfies the communication connection preconditions is present.

6. The upper-layer base station according to claim 1, wherein, if the communication load of the upper-layer base station exceeds a specified value, the upper-layer control section determines whether or not a lower-layer base station that satisfies the communication connection preconditions is present.

7. The upper-layer base station according to claim 1, wherein during the power saving mode a supply of power to the lower-layer base station is reduced so as to render wireless communications of the lower-layer base station inoperable such that the lower-layer base station is unable to transmit or receive radio waves.

8. The upper-layer base station according to claim 1, wherein during the power saving mode the lower-layer base station does not transmit or receive radio waves.

9. The upper-layer base station according to claim 1, wherein during the power saving mode the lower-layer base station does not transmit or receive radio waves, whereas during the normal mode, the lower-layer base station transmits and receives radio waves.

10. A wireless communication system that employs a structure in which lower-layer cells are superimposed onto an upper-layer cell, and that is provided with an upper-layer base station that forms the upper-layer cell and a plurality of lower-layer base stations that respectively form the plurality of lower-layer cells, wherein the upper-layer base station comprises: an upper-layer wireless section configured to achieve communication with at least one wireless terminal that is present within the upper-layer cell; an upper-layer inter-station communication section configured to achieve communication with the lower-layer base stations that form the lower-layer cells; and an upper-layer control section configured to, via the upper-layer inter-station communication section, command any one of the lower-layer base stations that satisfies preconditions for making a connection in order to communicate with a wireless terminal that is currently performing communication to switch from a power saving mode to a normal operation mode, and wherein each one of the lower-layer base stations comprises: a lower-layer wireless section configured to achieve communication with a wireless terminal that is present within the lower-layer cell; a lower-layer inter-station communication section configured to achieve communication with the upper-layer base station that forms the upper-layer cell; and a lower-layer control section configured to, when a lower-layer base station receives a command to switch from the power saving mode to the normal operation mode from the upper-layer base station via the lower-layer inter-station communication section, switch the operating mode of the lower-layer base station from the power saving mode to the normal operation mode, and when all of the wireless communication being performed by the lower-layer base station has ended, the lower-layer control section switches the operating mode of the lower-layer base station to the power saving mode, and if, based on the operating frequency and on the position information relating to the wireless terminal that were acquired by communicating with the wireless terminal, one of the lower-layer base stations is judged to be capable of dealing with the operating frequency of the wireless terminal, and the wireless terminal is judged to be positioned within the lower-layer cell of that lower-layer base station, then the upper-layer control section of the wireless communication system determines that the lower-layer base station is a lower-layer base station that satisfies the communication connection preconditions.

11. The wireless communication system according to claim 10, wherein, if, based on the position information relating to the wireless terminal, the wireless terminal that is currently performing communication is judged to be positioned within the lower-layer cell of one of the lower-layer base stations, the upper-layer control section of the wireless communication system determines that the lower-layer base station is a lower-layer base station that satisfies the communication connection preconditions.

12. The wireless communication system according to claim 10, wherein, if, based on the type of communication and on the position information relating to the wireless terminal, the type of communication is judged to be data communication, and the wireless terminal is judged to be positioned within the lower-layer cell of one of the lower-layer base stations, the upper-layer control section of the wireless communication system determines that the lower-layer base station is a lower-layer base station that satisfies the communication connection preconditions.

13. The wireless communication system according to claim 10, wherein, if the type of communication is audio communication, then irrespective of the position information, the upper-layer control section of the wireless communication system determines that no lower-layer base station that satisfies the communication connection preconditions is present.

14. The wireless communication system according to claim 10, wherein, if no lower-layer base station that is capable of dealing with the operating frequency of the wireless terminal is present, then irrespective of the position information, the upper-layer control section of the wireless communication system determines that no lower-layer base station that satisfies the communication connection preconditions is present.

15. The wireless communication system according to claim 10, wherein, if the communication load of the upper-layer base station exceeds a specified value, the upper-layer control section of the wireless communication system determines whether or not a lower-layer base station that satisfies the communication connection preconditions is present.

* * * * *